No. 641,125. Patented Jan. 9, 1900.
H. LEITNER.
ELECTRIC MOTOR.
(Application filed May 16, 1899.)
(No Model.) 3 Sheets—Sheet 1.

No. 641,125. Patented Jan. 9, 1900.
H. LEITNER.
ELECTRIC MOTOR.
(Application filed May 16, 1899.)
(No Model.) 3 Sheets—Sheet 2.

No. 641,125. Patented Jan. 9, 1900.
H. LEITNER.
ELECTRIC MOTOR.
(Application filed May 16, 1899.)
(No Model.) 3 Sheets—Sheet 3.

Witnesses
Inventor
Henry Leitner
By James L. Norris
atty

UNITED STATES PATENT OFFICE.

HENRY LEITNER, OF LONDON, ENGLAND.

ELECTRIC MOTOR.

SPECIFICATION forming part of Letters Patent No. 641,125, dated January 9, 1900.

Application filed May 16, 1899. Serial No. 717,064. (No model.)

*To all whom it may concern:*

Be it known that I, HENRY LEITNER, a citizen of England, residing at No. 207 Piccadilly, London, England, have invented certain new and useful Improvements in Electric Motors, (for which I have made application for a patent in Great Britain, No. 27,453, dated December 29, 1898,) of which the following is a specification.

My invention relates to an electric motor constructed as I shall describe, referring to the accompanying drawings.

Figure 1:
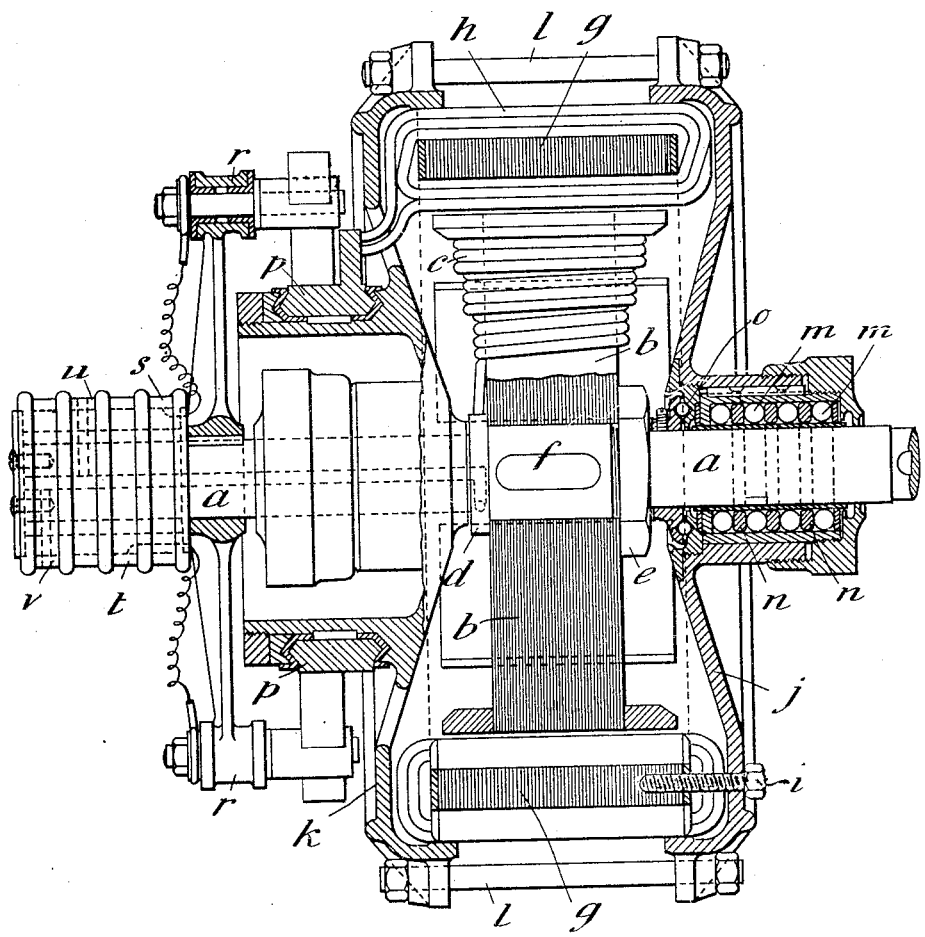
Figure 2:
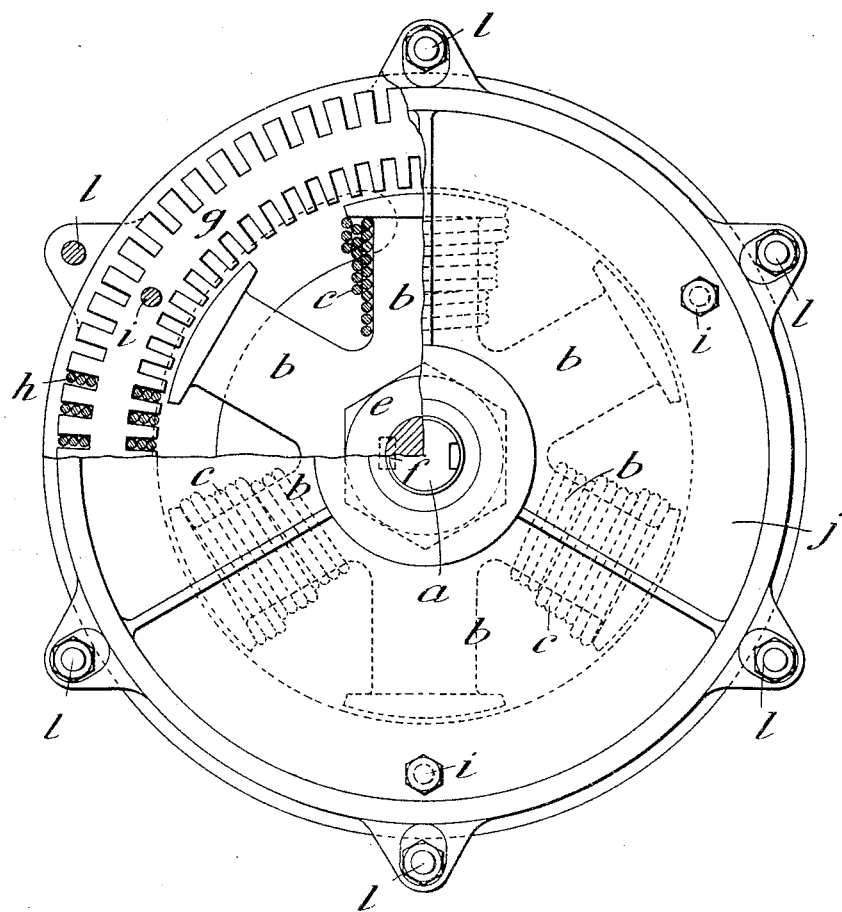
Figure 3:
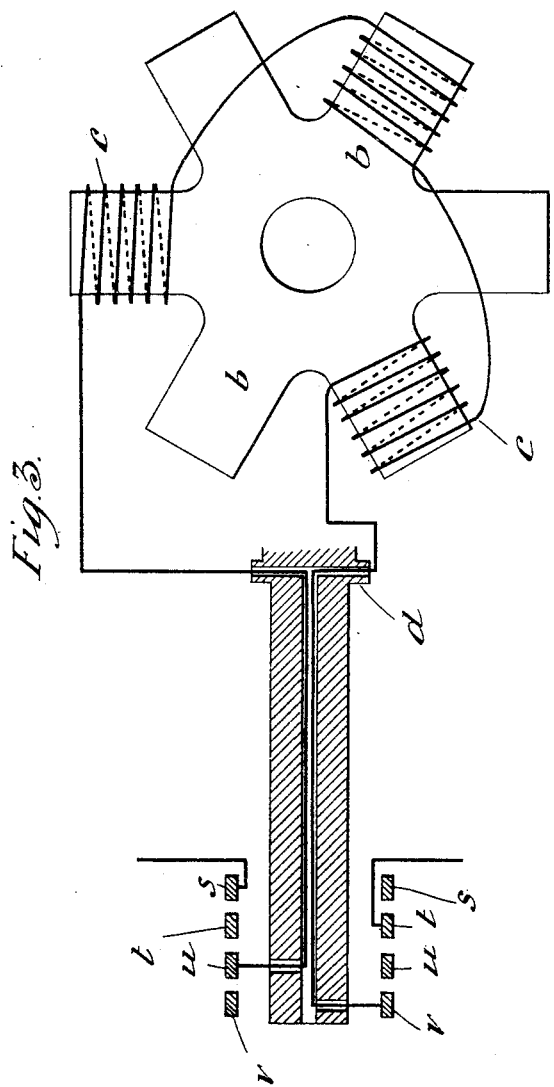

Figure 1 is a vertical section, partly in elevation, of a motor according to my invention. Fig. 2 is a side elevation, part of the left half of the casing being cut away to show part of the interior; and Fig. 3 is a diagram indicating the electric connections between the field-magnet coils.

On a shaft $a$ are fixed the field-magnets, consisting of iron laminæ cut so as to present six poles $b$, three of which are coiled with insulated wire $c$, the alternate poles having no coils. All the laminæ are clamped on the shaft between a collar $d$ and a nut $e$ and prevented from turning by a key $f$. The armature consists of iron laminæ $g$, serrated inside and outside to receive insulated wires $h$. These laminæ are bound together by copper rivets passing through them, and to the laminæ are attached, by screws $i$, two side frames $j$ $k$, which are connected together by bolts $l$ and which have projecting studs at intervals bearing against the laminæ $g$.

Both side frames have bosses containing ball-bearings which have four rows of balls $m$, separated by rings $n$, bearing on the shaft $a$, and another row of balls $o$ to take end thrust. The side frame $k$ has outside the bearing-boss another hollow boss, in which are fixed insulated the commutator-segments $p$. On the shaft $a$ are fixed the brush-holders $r$, which are themselves connected to rings $s$ and $t$. Other rings $u$ and $v$ are connected by wires led through a bore of the shaft $a$ to the ring $d$, through lateral holes of which they branch to the coils $c$.

In order to show how the brushes are connected to both rings $s$ and $t$, the one brush is shown opposite to the other; but it is to be understood that they are really placed upon the shaft in position determined by the magnet-poles.

The connections for the armature-coils are made in the ordinary manner to the commutator-segments $p$ and may obviously be grouped in many different ways, and the commutator-brushes are connected by wires to the rings $s$ and $t$, while the magnet-coils are connected by wires to the rings $u$ and $v$.

Obviously the shaft $a$ and magnets may be stationary while the armature, with its side frames, revolves, or the armature and side frames may be stationary while the shaft and magnets revolve, or both the armature and the magnets may revolve in opposite directions.

Having thus described the nature of this invention and the best means I know of carrying the same into practical effect, I claim—

The combination, in an electric motor, of a shaft having a bore, rings fixed on the end of the shaft, laminated field-magnets fixed to the shaft and having an even number of polar extensions the alternate ones of which have windings connected with some of said rings by conductors passing through the bore of the shaft, a laminated ring-armature surrounding the field-magnets, side frames loosely mounted on the shaft and between which the ring-armature is held, commutator-segments arranged on one of the side frames and connected by conductors with the armature-coils, and commutator-brushes arranged on the shaft and connected with some of said rings on the shaft, substantially as described.

In testimony whereof I have hereunto set my hand in presence of two subscribing witnesses.

HENRY LEITNER.

Witnesses:
 A. M. GLASS,
 FRED C. HARRIS.